(12) United States Patent
Bowers et al.

(10) Patent No.: US 11,010,690 B2
(45) Date of Patent: *May 18, 2021

(54) MACHINE LEARNING FOR DETERMINING CONFIDENCE FOR RECLAMATION OF STORAGE VOLUMES

(71) Applicant: International Business Machines Corporation, Armonk, NY (US)

(72) Inventors: John A Bowers, Austin, TX (US); Andrew J Laforteza, Austin, TX (US); Ryan D Mcnair, Austin, TX (US); Benjamin J Randall, Fort Collins, CO (US); Teresa S Swingler, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 30 days.

This patent is subject to a terminal disclaimer.

(21) Appl. No.: 16/449,418

(22) Filed: Jun. 23, 2019

(65) Prior Publication Data

US 2019/0311293 A1    Oct. 10, 2019

Related U.S. Application Data

(63) Continuation of application No. 15/173,562, filed on Jun. 3, 2016, now Pat. No. 10,445,659.

(51) Int. Cl.
*G06N 20/00* (2019.01)
*G06F 3/06* (2006.01)

(52) U.S. Cl.
CPC ............ *G06N 20/00* (2019.01); *G06F 3/067* (2013.01); *G06F 3/0608* (2013.01); *G06F 3/0629* (2013.01)

(58) Field of Classification Search
CPC ....................................................... G06N 20/00
USPC ...................................................... 706/15, 45
See application file for complete search history.

(56) References Cited

U.S. PATENT DOCUMENTS

| | | | |
|---|---|---|---|
| 6,282,621 | B1 | 8/2001 | Parsons |
| 7,620,943 | B1 | 11/2009 | Garthwaite |
| 7,702,873 | B2 | 4/2010 | Griess et al. |
| 8,635,422 | B1 | 1/2014 | Kaliannan et al. |
| 9,299,025 | B1 * | 3/2016 | Rubin .................... G06N 5/025 |
| 2009/0077543 | A1 | 3/2009 | Siskind |
| 2010/0241600 | A1 | 9/2010 | Krichevskiy |

(Continued)

OTHER PUBLICATIONS

IBM Patents or Patent Applications Treated as Related.
(Continued)

*Primary Examiner* — David R Vincent
(74) *Attorney, Agent, or Firm* — Jeffrey S LaBaw; Feb R Cabrasawan; Robert Sullivan

(57) ABSTRACT

A method, system and computer product for performing storage maintenance is described. A training set for storage volume reclamation is received. The training set for storage volume reclamation contains sets of storage parameters for storage volumes and corresponding user decisions whether the storage volumes are reclaimable. The training set is used to train a machine learning system to recognize reclaimable candidate storage volumes. The trained machine learning system is used to determine that a candidate storage volume for reclamation is likely a reclaimable storage volume.

20 Claims, 10 Drawing Sheets

(56) References Cited

U.S. PATENT DOCUMENTS

2014/0207997 A1 7/2014 Peterson et al.

OTHER PUBLICATIONS

Web Page at https://en.wikipedia.org/wiki/Perceptron retrieved May 23, 2016.
Kukar, "Estimating confidence Values of individual predictions by their typicalness and reliability", University of Ljublijana, Faculty of Computer and Information Science.
Web Page at https://en.wikipedia.org/wiki/Online_machine_learning retrieved May 23, 2016.

* cited by examiner

MACHINE LEARNING FOR DETERMINING CONFIDENCE FOR RECLAMATION OF STORAGE VOLUMES

BACKGROUND OF THE INVENTION

This disclosure relates generally to computer storage management. More particularly, it relates to reclaiming computer storage volumes.

In a large enterprise or cloud-based storage environment, storage teams are responsible for providing storage to many applications used by the business clients. Over time, applications may no longer need certain allocated storage volumes, or the applications and the servers they run on may be decommissioned entirely. Often there is imperfect communication between storage administrators and the teams responsible for the applications. This can result in situations where the failures to notify the storage team that volumes can be reclaimed result in the storage volumes being unused, but consuming storage resources due to their allocation. Many storage teams lack the time and resources to hunt down reclaimable storage throughout the enterprise. Even those storage teams who have the resources to devote to reclamation report that it is a lengthy focused effort that is only undertaken several times per year.

A common technique for finding storage volumes which are candidates for reclamation is to use a tool to run a report for "orphan" volumes. Orphan or orphaned volumes are volumes that do not have an owning system assigned. The orphan volumes can be detected by scanning for the presence of host mappings on the storage system. Some tools create reports by correlating the relationships between servers' logical volumes and the volumes on the storage system. Unfortunately, many reports have errors and omissions. Further, there are valid reasons why a storage volume without a host assignment should not be reclaimed. For example, if the volume is a replication target or being used as part of a solution that does not require an explicit host assignment, e.g., count key data (CKD). So the mere fact that a storage volume is an orphan volume is insufficient to indicate that it should be reclaimed in a storage maintenance operation. In addition, other storage volumes, besides orphan volumes, are potential reclamation candidates.

An alternative approach for identifying storage volumes for storage reclamation or other storage maintenance is to query for storage volumes that have had no or minimal input/output for a sustained period of time, e.g., two weeks. This approach has the disadvantage of identifying false positives, such as volumes that are only active on a monthly or quarterly basis when batch processing occurs.

BRIEF SUMMARY

According to this disclosure, a method, apparatus and computer program product for performing storage maintenance. A training set for storage volume reclamation is received. The training set for storage volume reclamation contains sets of storage parameters for storage volumes and corresponding user decisions whether the storage volumes are reclaimable. The training set is used to train a machine learning system to recognize reclaimable candidate storage volumes. The trained machine learning system is used to determine that a candidate storage volume for reclamation is likely a reclaimable storage volume.

The foregoing has outlined some of the more pertinent features of the disclosed subject matter. These features should be construed to be merely illustrative. Many other beneficial results can be attained by applying the disclosed subject matter in a different manner or by modifying the invention as will be described.

BRIEF DESCRIPTION OF THE DRAWINGS

For a more complete understanding of the present invention and the advantages thereof, reference is now made to the following descriptions taken in conjunction with the accompanying drawings, in which.

DETAILED DESCRIPTION OF AN ILLUSTRATIVE EMBODIMENT

At a high level, in preferred embodiments of the invention, an improved method, system and computer product identifies reclaimable storage volumes using machine learning techniques, and environmental metadata. Using machine learning allows embodiments of the invention to continually refine and tailor the reclamation process for each specific storage environment to improve recommendation accuracy. Embodiments of the invention provide additional flexibility to adjust the number of candidate reclaimable storage volumes presented to the user based on user context and an adjustable confidence level. Embodiments of the invention use the machine learning to adjust a probabilistic scoring algorithm used to calculate the confidence level that a storage volume is reclaimable.

Figure 1:
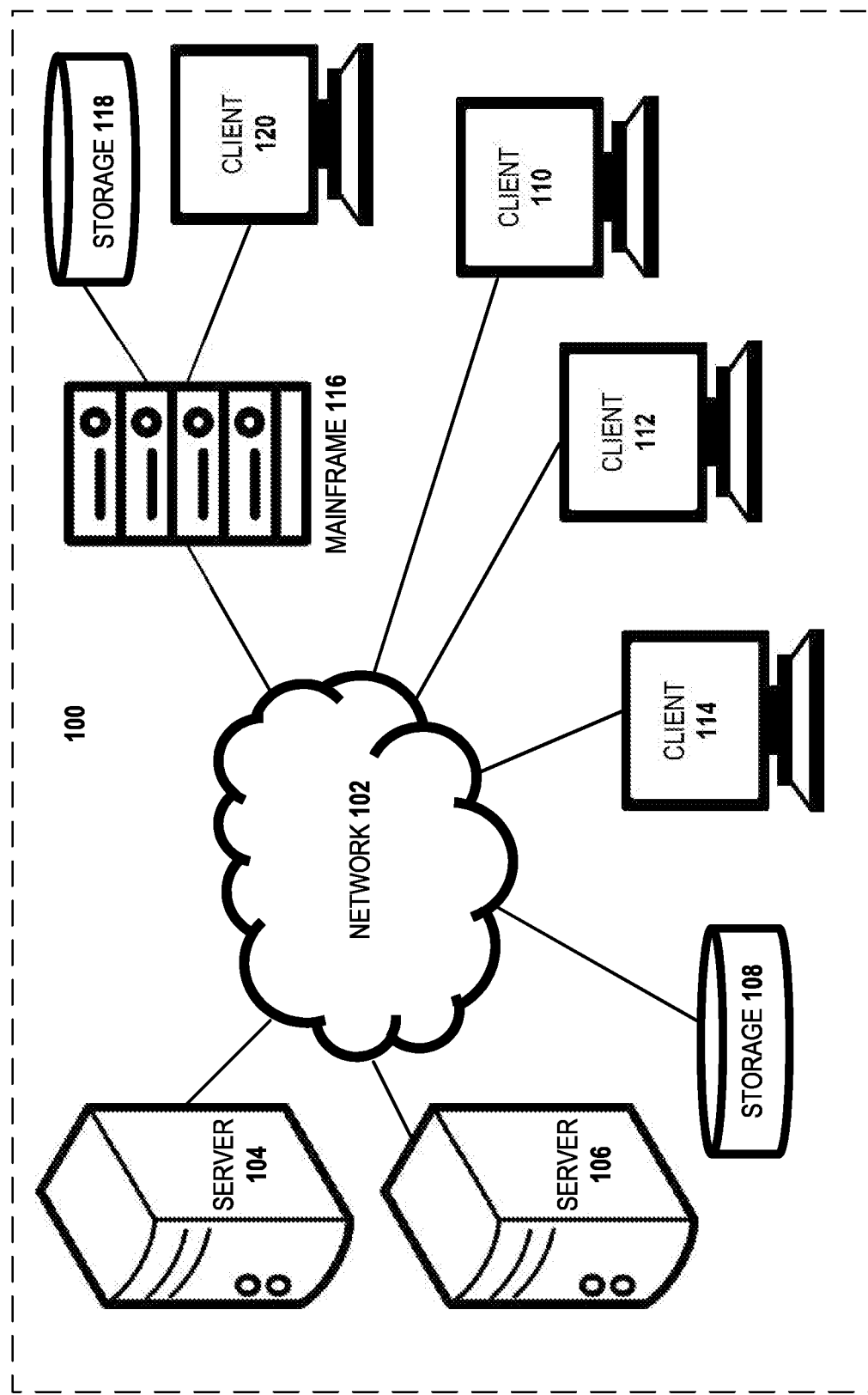
FIG. 1 depicts an exemplary block diagram of a distributed data processing environment in which exemplary aspects of the illustrative embodiments may be implemented.
Figure 2:
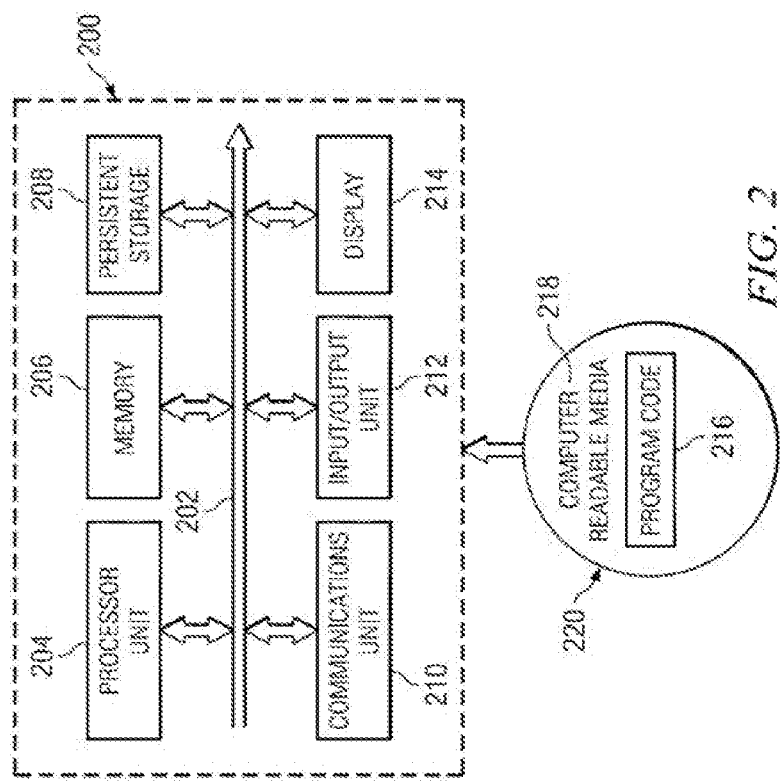
FIG. 2 is an exemplary block diagram of a data processing system in which exemplary aspects of the illustrative embodiments may be implemented.

With reference now to the drawings and in particular with reference to FIGS. 1-2, exemplary diagrams of data processing environments are provided in which illustrative embodiments of the disclosure may be implemented. It should be appreciated that FIGS. 1-2 are only exemplary and are not intended to assert or imply any limitation with regard to the environments in which aspects or embodiments of the disclosed subject matter may be implemented. Many modifications to the depicted environments may be made without departing from the spirit and scope of the present invention.

With reference now to the drawings, FIG. 1 depicts a pictorial representation of an exemplary distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like. In the depicted example, server 104 provides data, such as boot files, operating system images, and applications to the clients 110, 112, and 114. Clients 110, 112, and 114 are clients to server 104 in the depicted example. Distributed data processing system 100 may include additional servers, clients, and other devices not shown.

In the drawing, mainframe computer 116 is shown connected to network 102. Mainframe computer 116 can be, for example, an IBM System z mainframe running the IBM z/OS operating system. Connected to the mainframe 116 are mainframe storage unit 118 and client 120. Client 120 is either a PC connected directly to the mainframe communicating over a bus, or a console terminal connected directly to the mainframe via a display port.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the disclosed subject matter, and therefore, the particular elements shown in FIG. 1 should not be considered limiting with regard to the environments in which the illustrative embodiments of the present invention may be implemented.

With reference now to FIG. 2, a block diagram of an exemplary data processing system is shown in which aspects of the illustrative embodiments may be implemented. Data processing system 200 is an example of a computer, such as client 110 in FIG. 1, in which computer usable code or instructions implementing the processes for illustrative embodiments of the disclosure may be located.

With reference now to FIG. 2, a block diagram of a data processing system is shown in which illustrative embodiments may be implemented. Data processing system 200 is an example of a computer, such as server 104 or client 110 in FIG. 1, in which computer-usable program code or instructions implementing the processes may be located for the illustrative embodiments. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor (SMP) system containing multiple processors of the same type.

Memory 206 and persistent storage 208 are examples of storage devices. A storage device is any piece of hardware that is capable of storing information either on a temporary basis and/or a permanent basis. Memory 206, in these examples, may be, for example, a random access memory or any other suitable volatile or non-volatile storage device. Persistent storage 208 may take various forms depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard and mouse. Further, input/output unit 212 may send output to a printer. Display 214 provides a mechanism to display information to a user.

Instructions for the operating system and applications or programs are located on persistent storage 208. These instructions may be loaded into memory 206 for execution by processor unit 204. The processes of the different embodiments may be performed by processor unit 204 using computer implemented instructions, which may be located in a memory, such as memory 206. These instructions are referred to as program code, computer-usable program code, or computer-readable program code that may be read and executed by a processor in processor unit 204. The program code in the different embodiments may be embodied on different physical or tangible computer-readable media, such as memory 206 or persistent storage 208.

Program code 216 is located in a functional form on computer-readable media 218 that is selectively removable and may be loaded onto or transferred to data processing system 200 for execution by processor unit 204. Program code 216 and computer-readable media 218 form computer program product 220 in these examples. In one example, computer-readable media 218 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer-readable media 218 also may take the form of a persistent storage, such as a hard drive, a thumb drive, or a flash memory that is connected to data processing system 200. The tangible form of computer-readable media 218 is also referred to as computer-recordable storage media. In some instances, computer-recordable media 218 may not be removable.

Alternatively, program code 216 may be transferred to data processing system 200 from computer-readable media 218 through a communications link to communications unit 210 and/or through a connection to input/output unit 212. The communications link and/or the connection may be physical or wireless in the illustrative examples. The computer-readable media also may take the form of non-tangible media, such as communications links or wireless transmissions containing the program code. The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown. As one example, a storage device in data processing system 200 is any hardware apparatus that may store data. Memory 206, persistent storage 208, and computer-readable media 218 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

Computer program code for carrying out operations of the present invention may be written in any combination of one or more programming languages, including an object-oriented programming language such as Java™, Smalltalk, C++, C#, Objective-C, or the like, and conventional procedural programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Those of ordinary skill in the art will appreciate that the hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system, other than the SMP system mentioned previously, without departing from the spirit and scope of the disclosed subject matter.

As will be seen, the techniques described herein may operate in conjunction within the standard client-server paradigm such as illustrated in FIG. 1 in which client machines communicate with an Internet-accessible Web-based portal executing on a set of one or more machines. End users operate Internet-connectable devices (e.g., desktop computers, notebook computers, Internet-enabled mobile devices, or the like) that are capable of accessing and interacting with the portal. Typically, each client or server machine is a data processing system such as illustrated in FIG. 2 comprising hardware and software, and these entities communicate with one another over a network, such as the Internet, an intranet, an extranet, a private network, or any other communications medium or link. A data processing system typically includes one or more processors, an operating system, one or more applications, and one or more utilities.

Determining when it is possible to reclaim a storage volume is often a very difficult, manual, and time-consuming process, involving analyzing thousands of volumes for multiple characteristics. The cost of identifying these reclaimable storage volumes diminishes the overall value of reclaiming storage. To remedy this issue, the reclamation algorithms of the present invention provide a way to automatically identify the storage volumes that can be repurposed.

This disclosure describes an improved way to identify the reclaimable storage volumes using machine learning techniques and environmental metadata. Embodiments of the invention provide flexibility to adjust the number of candidate storage volumes presented based on user context and continually refine and tailor the reclamation algorithms for each specific storage environment to improve recommendation accuracy.

Figure 3:
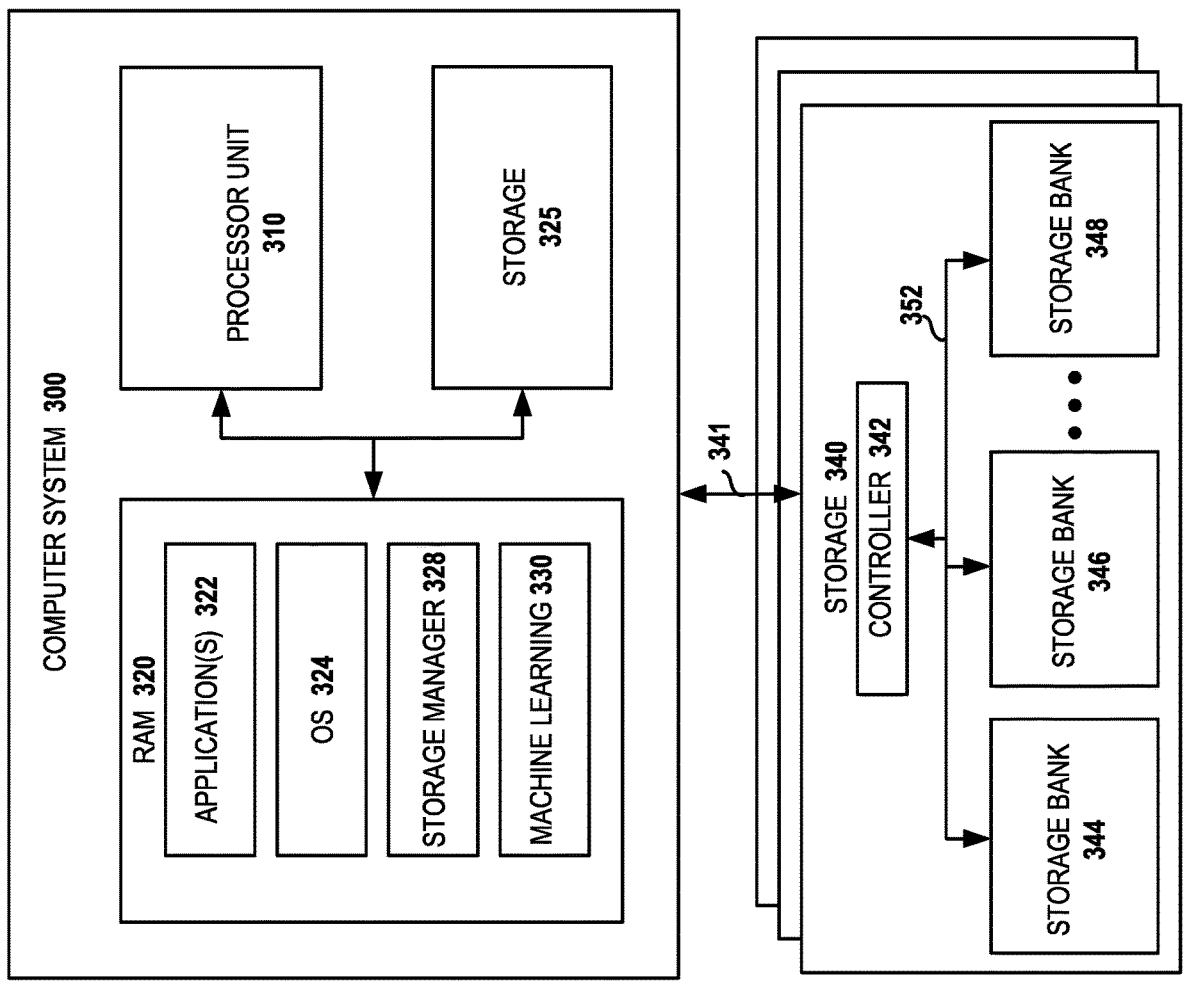
FIG. 3 illustrates a more detailed exemplary computer environment in which the disclosed subject matter may be implemented.

Turning now to FIG. 3, a block diagram of computer system 300 is depicted in which the invention may be implemented. Computer system 300 may be any suitable type of computer system such as a server, laptop, desktop, a mobile device, as described above in relation to FIGS. 1 and 2. In the illustrative embodiment, computer system 300 includes a processor unit 310 and random access memory (RAM) 320, and storage 325 coupled together via a bus 327. As shown, RAM 320 includes program instructions for one or more applications 322 and an operating system (OS) 324 executable by processor unit 310. In the illustrated embodiment, RAM 320 includes program instruction for storage manager 328 and machine learning application 330. In this illustrative embodiment, storage manager 328 and machine learning application 330 cooperatively manage one or more storage facilities 340 coupled to the computer system 300 via interconnect(s) 341.

In various embodiments, the functions of storage manager 328 and machine learning application 330 may be implemented in software, hardware or a combination thereof. For example, in the illustrative embodiment, storage manager 328 and machine learning application 330 are implemented by software outside of OS 320, as an application. In another embodiment, this functionality is realized by software stored within a memory of controller 342 and executed by a processor of controller 342. In still another embodiment, controller 342 comprises dedicated circuitry to implement storage manager 328 and machine learning application 330. In one preferred embodiment, the storage manager 328 can be IBM Spectrum Control which provides a centralized point of control for managing large-scale, complex heterogeneous storage environments. Other embodiments of the invention can use other storage management products such as CA Storage Resource Manager or Symantec Command-Central Storage products.

After an initial training period, in a preferred embodiment, machine learning application 330 uses the reclamation decisions made by users of the storage manager 328 to predict, e.g., calculate a confidence level, whether a members of set of detected candidate storage volumes are reclaimable. The reclaimable storage volumes can be "orphan" volumes or other candidate storage volumes having a confidence level which exceeds the configurable threshold. Orphan volumes are obvious candidates for reclamation, but the machine learning application 330 can identify non orphan storage volumes that can be reclaimed based on the user context and learned experience in a particular storage environment.

In some preferred embodiments, storage manager 328 manages multiple storage facilities 340. The storage facilities may be run by the same type of storage controller 342 or different types of storage controllers 342. The storage medium used in the respective storage banks 344, 346 and 348 can be any physical medium upon which data can be stored. As used herein, the term "stored" refers broadly to the process of any computing system storing, writing or otherwise transferring one or more data values on to some physical medium for subsequent use. Accordingly, a "physical storage medium" is used herein to refer to any medium on which data may be stored by a computing device. Further, the terms "storage" and "memory" are used herein to be synonymous with "physical storage medium" and may refer to volatile and/or non-volatile media. Such media may also be referred to herein as "memory," and portions of such media may be referred to as "blocks," "cells," "storage blocks," "memory blocks," etc. A group of these blocks may be referred to as a "storage array," "memory array," and other terms used by those skilled in the art to refer to physical storage. In some embodiments, storage 340 includes non-volatile storage devices such as hard disk, tape drives, and writable optical drives. In other embodiments, storage 340 is implemented to include non-volatile solid-state memory. In such an embodiment, storage banks 344, 346 and 348 include one or more suitable types of solid-state storage media.

Figure 4:
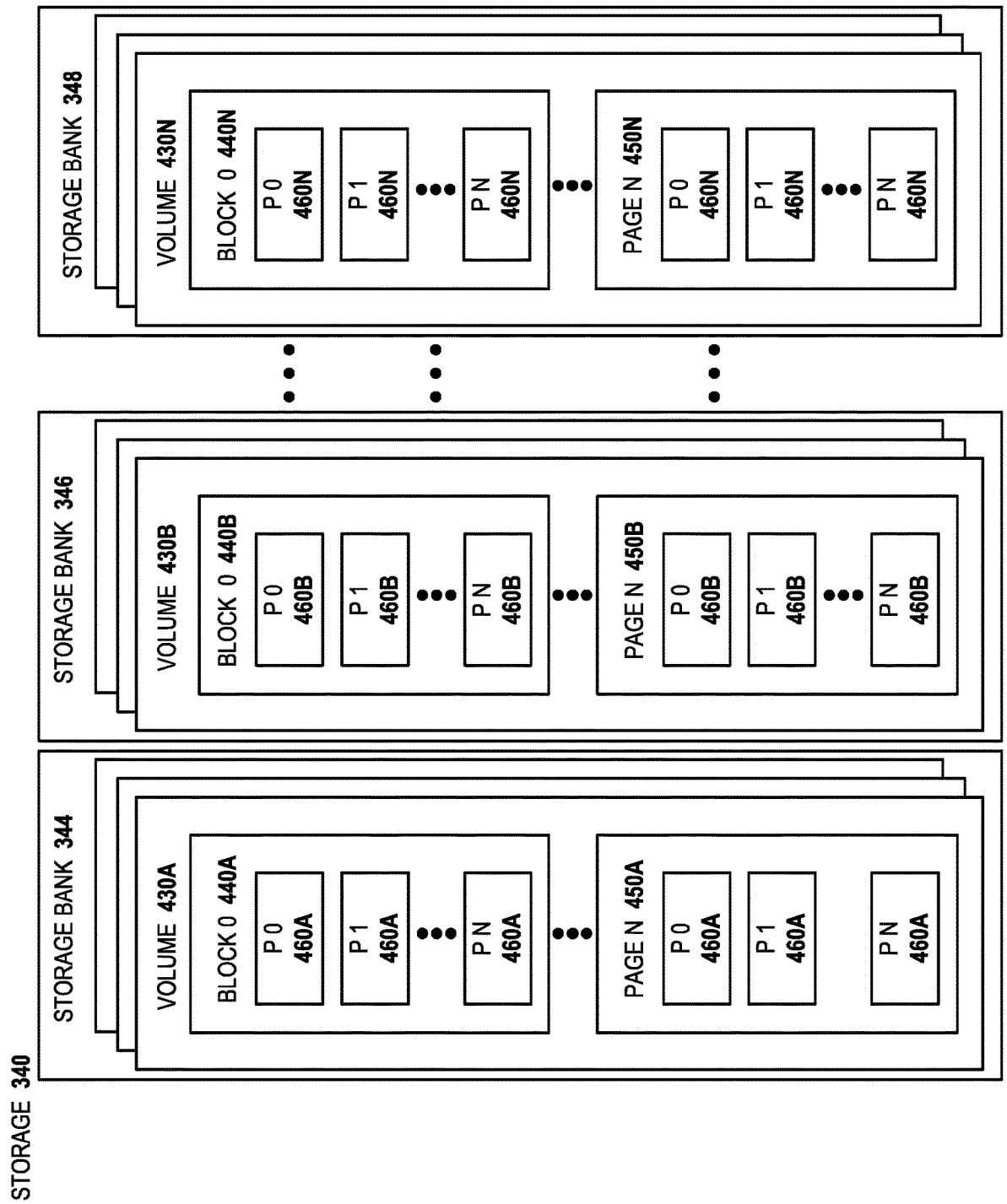
FIG. 4 illustrates a logical map of a storage facility.

In the illustrated embodiment, each storage 340 includes a storage controller 342 coupled to storage banks 344, 346, 348 via a bus 352. In addition to managing read and write operations at specified addresses, the storage controller 342 allocates storage volumes within the selected storage banks 344, 346, 348 to respective applications as and tracks the read and write accesses over time. In preferred embodiments of the invention, the physical storage media within the storage banks is organized logically so that a respective storage bank is comprised of a plurality of storage volumes. Each storage volume is a respective accessible storage area and may be organized into smaller logical units, e.g., pages, blocks. Each storage volume is a logical entity which corresponds to a portion of the physical storage media, An illustration of the logical division of a storage facility 340 is shown in FIG. 4. The storage banks 344, 346 and 348 are shown divided into a plurality of storage volumes 430 A-N. Further each volume is shown further divided into a plurality of logical pages 440A-N and 450A-N. Each page is further divided into a set of logical blocks 460A-N. In most storage management systems, storage is assigned to applications on a storage volume basis, and the pages and blocks are written to on an as needed basis according to the requests made by the application. Periodically, as storage volumes are "orphaned", or unused even if assigned to a host, there are opportunities to reclaim them so that they can be assigned to other applications. Those skilled in the art will recognize that other logical organizations of storage exist, and that FIG. 4 is merely an illustrative environment in which the invention can be implemented.

Figure 5:
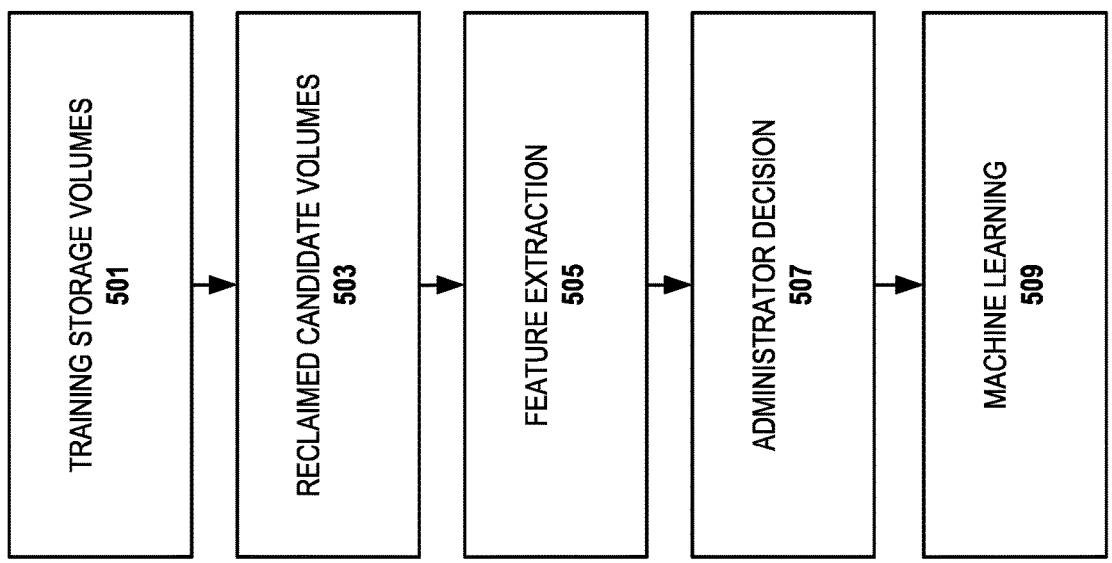
FIG. 5 illustrates a flow diagram of training a machine learning program using storage parameters according to an embodiment of the invention.

FIG. 5 illustrates a flow diagram of training a machine learning program using features according to an embodiment of the invention. In preferred embodiments of the invention, a machine learning model is used to predict whether one or more storage volumes is reclaimable using features of storage volumes which have been previously reclaimed. A training set is identified in step 501 for training the system. The training set may be input by a user. For example, a training set can be manually compiled from the administrator decisions made with respect to orphaned and other reclaimable storage volumes. For example, a survey in which hypothetical orphan storage volumes are listed together with a set of hypothetical storage parameters can be presented to a plurality of system administrators. The survey would collect the administrators' decisions whether they would reclaim or reject the respective hypothetical storage volume, or would request more information prior to making the decision.

In preferred embodiments of the invention, the training set is automatically generated from a request to the storage manager to provide a log of previously reclaimed storage volumes together with a set of storage parameters and storage metadata. The retrieved information is then parsed for the reclaimed storage volumes together with the corresponding set of storage parameters of the reclaimed storage volume which will be used to train the machine learning application. Many machine learning applications will store the set of storage parameters as a feature vector. In embodiments of the invention, the training set also comprises information from the storage manager for the candidate storage volumes which were presented to the administrator, but not selected for reclamation, together with the storage parameters for those storage volumes, if such information is available. In preferred embodiments of the invention, a minimum number of storage volumes are selected for the training set.

If the storage manager is used to manage volumes for a plurality of storage controllers, preferred embodiments of the invention use a separate training set for each storage controller as separate training sets will tend to customize the machine learning for a particular storage environment. In other embodiments of the invention, the experience of multiple storage controllers can be combined to give a bigger training set. If the storage controllers were of the same type or maintained by the same administrator, the training set data from two storage controllers are more likely to be similar. In the embodiments that training sets are retrieved from multiple types of storage controllers, the storage parameters for the reclaimed storage volumes are normalized so that the experience gained for one storage controller can be used to predict the reclaimability of storage volumes controlled by other storage controllers. As will be described below, embodiments of the invention, even when using such a combined training set, will become customized to the storage environment as user feedback is acquired concerning new candidate storage volumes as they are reclaimed by the user.

Next, in step 503, the set of the reclaimed storage volumes is examined for suitability for ingestion into the machine learning system. Typical characteristics of a reclaimed storage volume would include no I/O for a period of time, inactive, storage volume is not used by application even though assigned to a host, no allocated space by the application on the volume. A reclaimed storage volume may not be suitable for ingestion if there are no associated storage parameters, and so would skew the machine learning in an unwelcome direction. In step 505, the storage features are extracted using a feature extraction technique. In preferred embodiments of the invention, the log of the storage manager is parsed to locate the set of storage parameters such as last I/O, host attachments, historical access patterns used to train the machine learning application. In alternative embodiments of the invention storage metadata associated with the storage volume can be used a source of storage parameters. One skilled in the art will understand that other feature extraction methods can be used in embodiments of the invention. Next, the administrator decisions whether to reclaim respective candidate storage volumes are associated with the respective extracted set of features, in step 507. The identified features, e.g., set of storage parameters, and the administrator decisions are fed into the machine learning system, step 509, so that the correlations between the identified features and the corresponding storage volume are made by the machine learning system. At the conclusion of the analysis, the system is trained to recognize storage features shared by candidate storage volumes judged to be reclaimable. These features can be stored as vectors as described above.

Figure 6:
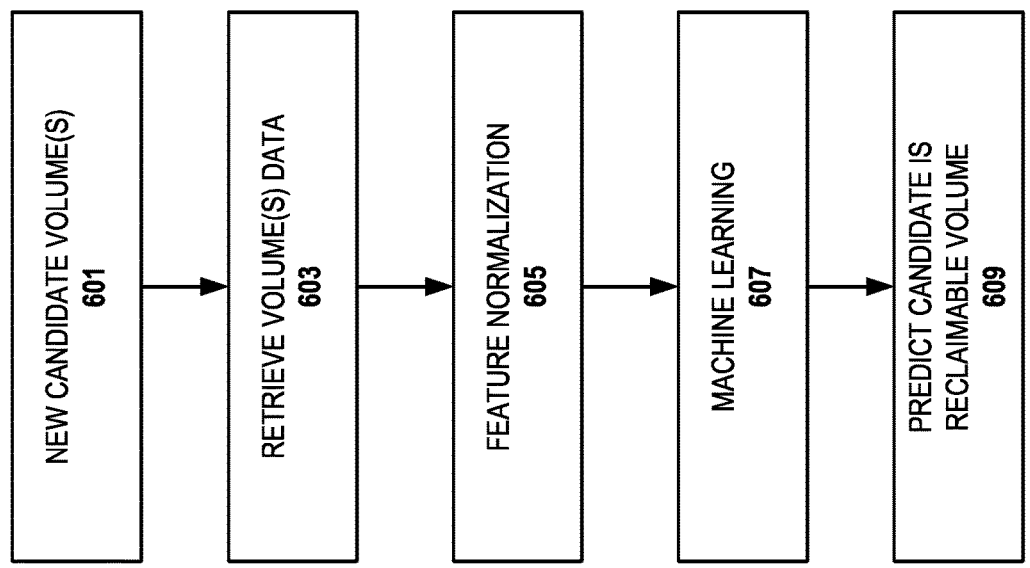
FIG. 6 illustrates a flow diagram of predicting whether orphan storage volumes are reclaimable according to an embodiment of the invention.

FIG. 6 illustrates a flow diagram of predicting whether a newly identified set of candidate storage volumes are reclaimable using the storage features of each respective volume in the set according to an embodiment of the invention. In step 601, the new set of candidate storage volumes, which may comprise a single storage volume, is identified for the machine learning to predict whether members of the set are reclaimable. In step 603, the storage parameters for the set of candidate storage volumes are retrieved. In preferred embodiments, the same mechanisms used to derive the storage parameter feature vectors are used. However, in alternative embodiments, some of the parameters may be provided by other mechanisms. In step 605, the features are normalized, if needed, to the storage format used by the machine learning application, e.g., a feature vector. In embodiments, some of the elements of the storage parameters may be more significant than others and so may be weighted differently in a reclamation confidence scoring algorithm. In step 607, the extracted features are analyzed by the previously trained machine learning algorithm. In the preferred embodiment, the same machine learning algorithm used to derive the feature vectors during training is used for the prediction.

In step 609, the machine learning application predicts which candidate volumes which are reclaimable. In preferred embodiments, all candidate volumes which exceed a threshold level of reclamation confidence are displayed to the user in a graphical user interface. A plurality of algorithms may be used to score the reclamation confidence level, allowing voting by each of the plurality of algorithms. The algorithms can include how closely the feature vectors of the respective candidate volumes match the learned feature vectors associated with a reclaimable volume by the machine learning application. The algorithms can include a weighted scoring algorithm, wherein the weights are adjusted by the machine learning application. In embodiments of the invention, the permissions or other context of the user are used to set the confidence threshold. Modifying the threshold is performed depending on the current user's permissions or contexts, e.g., the confidence threshold for a storage administrator would be lower than the confidence threshold for an application user, because of the greater skill and knowledge of the storage administrator. An application user having permissions only for a first application would not be shown storage volumes allocated to other applications. Other embodiments of the invention allow a user input value for the minimum reclamation confidence they want to view. Comparing feature vectors is a comparison method frequently used in machine learning systems, however, those skilled in the art will recognize that other comparison methods can be used in alternative embodiments of the invention.

Figure 7:
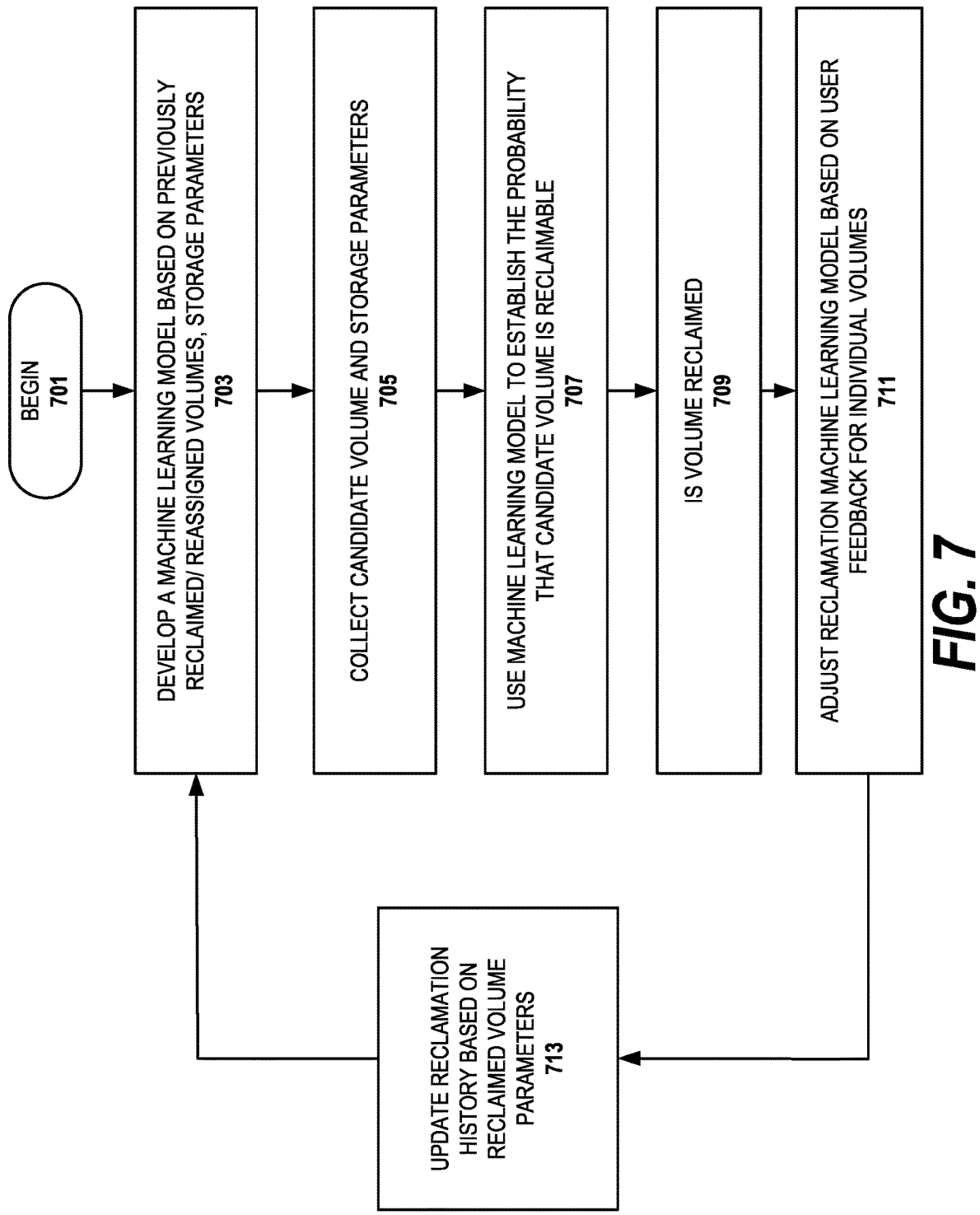
FIG. 7 is a flow diagram of periodically updating the machine learning program according to an embodiment of the invention.

FIG. 7 is a flow diagram of periodically updating the machine learning program according to an embodiment of the invention. In preferred embodiments, the process begins, 701, with the machine learning system already trained to recognize candidate storage volumes based on the training set of previously reclaimed and reassigned volumes and their associated storage parameters such as time of last I/O, host assignment (or lack thereof), access patterns, step 703. As new volumes are reclaimed by users interacting with the storage manager, the storage manager sends the machine learning system the storage parameters associated with the reclaimed volumes. In step 705, a set of new candidate storage volumes are candidates for reclamation and its information, e.g., storage volume ID, time of last I/O, host assignment, access patterns are collected. The machine learning application is used to predict a reclamation confidence level that the new candidate storage volumes are reclaimable based on the machine learning scoring, e.g., how similar the storage parameter features of the new storage volumes are to those of the already reclaimed storage volumes.

The confidence level information is presented to the user in an interface, step 707. In embodiments of the invention, only members of the set of candidate volumes which have a confidence level score exceeding a reclamation threshold are presented to the user. The user interface can present the set of storage parameters for each set of candidate volumes to aid in the decision whether to reclaim the storage volume. The user will select among the set of candidate volumes in step 709, converting some of the candidate volumes into reclaimed volumes. Next, in step 711, the machine learning system receives the feedback indicating whether the user has decided to reclaim the candidate volumes on an individual volume basis. In embodiments of the invention, the machine learning application uses the feedback to dynamically adjust the machine learning model and/or scoring algorithms as the selections are made by the user. The feedback can be positive, i.e. that the candidate reclaimable storage volume has been reclaimed by the user, or negative, that a candidate storage volume has been rejected or ignored by the user. Embodiments of the invention consider that a continued user inaction with regard to selection of a candidate storage volume for a predetermined period of time, while the user selects other candidate storage volumes to be a negative feedback for the unselected volumes.

In step 713, the reclamation history is updated based on the newly reclaimed volumes and their associated storage parameters. The set of storage volumes which were presented as candidates for reclamation and were rejected or not selected by the user can also be part of the history. In alternative embodiments of the invention, the reclamation model of the machine learning system is not continuously updated as depicted in step 711. Instead, a batch of new reclamation decisions is stored until a predetermined number of decisions is accumulated. The accumulated decisions are used as a new training set and are fed into the machine learning model in step 703. Since machine learning is a computationally intensive operation, in many embodiments of the invention, it is better to update the reclamation model periodically only when a sufficient number of new decisions have been gathered.

Figure 8:
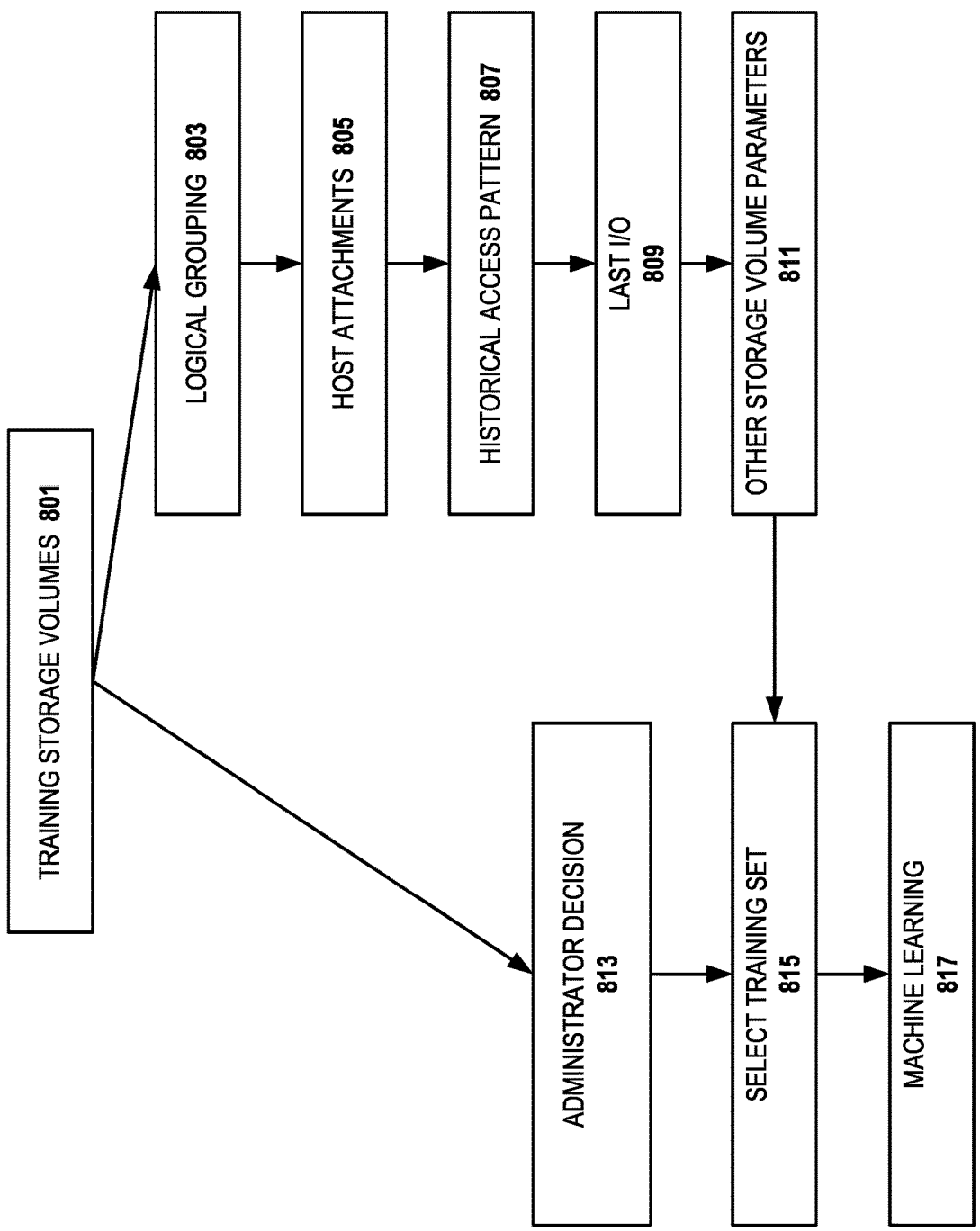
FIG. 8 illustrates a flow diagram training a machine learning program according to another embodiment of the invention.

FIG. 8 illustrates a flow diagram training a machine learning program according to another embodiment of the invention. As was mentioned above, separate scoring algorithms and machine learning models can be developed for different storage controllers. As described in relation to FIGS. 8 and 9, this principle can be extended to analyze candidate storage volumes in "logical groupings" of any kind. Instead of developing separate scoring algorithms and machine learning models for different storage controllers, in these embodiments, the machine learning models are customized to a particular "logical grouping" of storage volumes. The logical groupings can include logical groupings of storage volumes according to a storage consumer, such as a server, an application, an administrator or a line of business. The logical groupings by storage customer can extend across storage controllers or separate scoring algorithms and machine learning models can be developed for each storage controller for each storage customer. As will be described below, the logical grouping of the storage volumes is used to update a respective scoring algorithm and/or machine learning model for the logical volume grouping.

One example of where logical grouping would be useful is automatically identifying batch jobs which are performed infrequently, but periodically. In such a situation, the reclamation confidence for the volume grouping associated with the batch job would normally have a cyclic pattern, consistently dropping from a high confidence to a low confidence at the regular interval. Using a machine learning model tuned to recognize the cyclic pattern for the particular storage volumes would start to give the particular storage volumes low confidence levels that they were candidates for reclamation since history has shown that it is likely that they will be needed for the regularly scheduled batch job, despite the lack of I/O activity and other storage parameters which would normally indicate a reclaimable volume.

The process begins in step 801 where the training storage volumes are selected according the logical groupings of interest. In one preferred embodiment, training storage volumes from one storage controller are selected for a set of storage customers. In step 803, the reclaimed storage volumes, and optionally, also storage volumes rejected for reclamation, for each of the respective storage customers are selected from the overall set of storage volumes retrieved from the storage manager for the storage controller of interest. The selected storage volumes are then grouped according to the logical grouping selected for training. Next, in a series of steps, the storage parameters associated with each of the selected storage volumes are retrieved. One skilled in the art would recognize that instead of multiple retrievals, other embodiments of the invention would retrieve all of the storage parameters and then parse for the relevant parameters. For example, in step 805, the host attachments are retrieved. In step 807, the historical access patterns are retrieved. A historical access pattern which shows a relatively constant set of accesses, and then a sharp drop-off to few or no accesses would be a likely reclamation candidate.

In step 809, the last I/Os for each of the selected storage volumes is retrieved. In general, storage volumes which have not been accessed within a given period of time are more likely reclamation candidates. In step 811, other storage volume parameters are retrieved according to the model such as storage metadata. In embodiments of the invention, all storage volume parameters are retrieved for the selected volumes as unanticipated storage parameters may be discovered to be relevant by the machine learning application.

In step 813, the administrator decisions (reclaim, reject, ignore) are associated with each selected volume. The administrator decisions, together with the set of storage parameters, are used in step 815 to construct the training sets. In this embodiment, separate training sets are constructed for each of the logical groups. In step 817, the training sets are input into the machine learning system, for example, a Support Vector Machine (SVM) machine learning system, so that correlations between the storage volume features and the reclamation decisions are made for the respective logical group. Other machine learning systems include Logistic, Neve Bayes and Random Forest Classifiers. The result of the machine learning is a set of machine learning models or scoring algorithms, each for a respective logical group.

Figure 9:
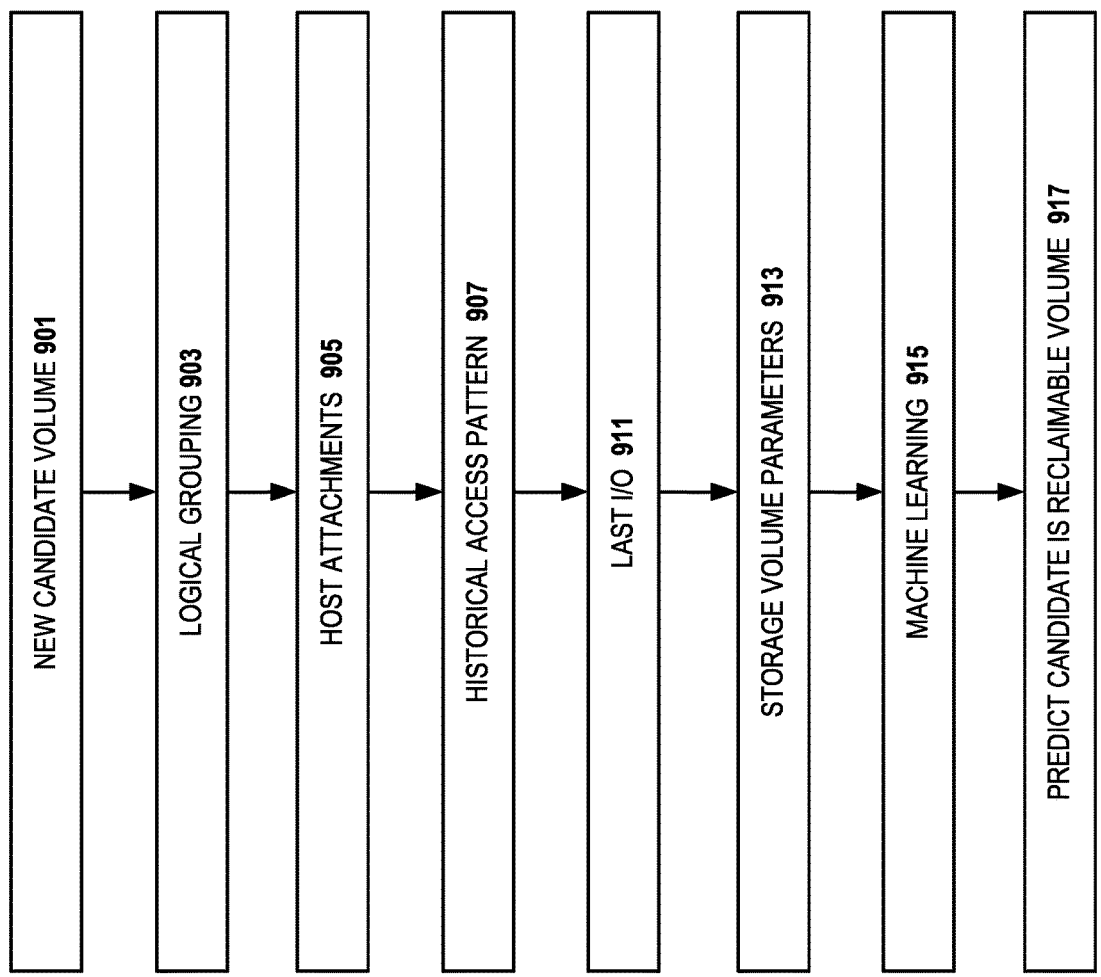
FIG. 9 is a flow diagram of predicting whether an orphan storage volume is reclaimable according to another embodiment of the invention.

FIG. 9 is a flow diagram of predicting whether a candidate storage volume is reclaimable according to another embodiment of the invention. In step 901, a new set of candidate storage volumes is available for evaluation. In step 903, the logical grouping of the candidate storage volumes is established. If the logical grouping is based on the storage customer basis, the appropriate machine learning model and/or confidence scoring models for the storage customer which "owns" the candidate storage volumes are retrieved. In step 905, the host attachments for the respective candidate storage volumes are retrieved. In the event that the logical groupings for the candidate storage volumes were incorrect, the host attachment can serve as a check. In step 907, the historical access patterns for the candidate storage volumes are retrieved. The log of the storage manager is useful for this information, however, logs kept by the storage controller are another possible source for the historical access information. In step 911, the last I/O is retrieved. In step 913, the extraction of other relevant storage volume parameters for the candidate storage volumes are retrieved, that is storage parameters used by the machine learning volume or the confidence scoring algorithms.

In step 915, the sets of storage volume parameters for the new candidate storage volumes are evaluated by using the machine learning program. In preferred embodiments, the machine learning uses the scoring algorithm and/or machine learning model for the particular logical grouping, i.e. selecting among the available scoring algorithms and machine learning models. Finally in step 917, the predictions of whether the candidate volumes are reclaimable is presented to the user. As above, the predictions can be accompanied by the confidence scores and by the evidence that the confidence scores are accurate, for example, the evidence can be the storage parameters associated with the storage volume.

Figure 10:
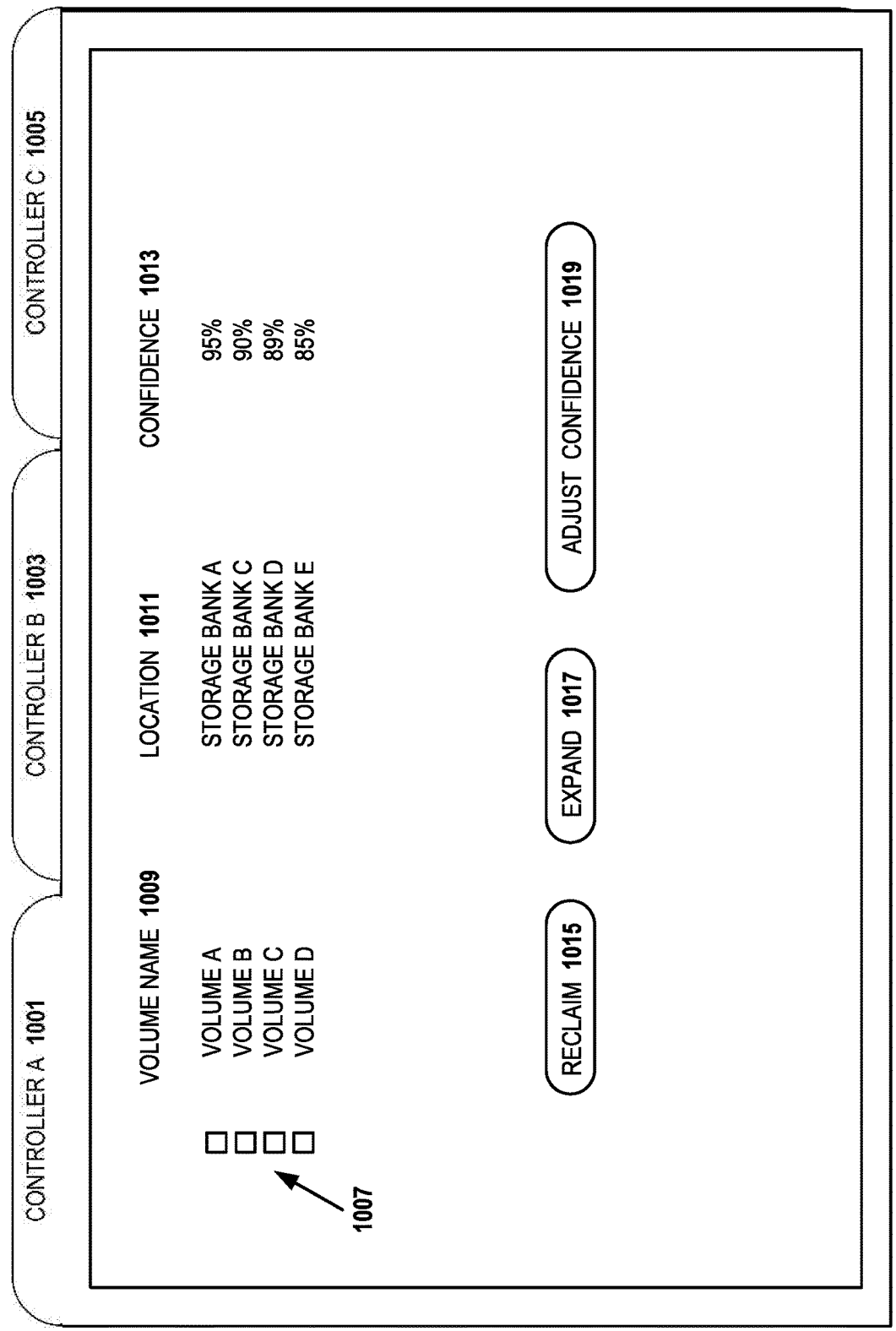
FIG. 10 illustrates an exemplary user interface for a preferred embodiment of the invention.

An exemplary user interface for a preferred embodiment is shown in FIG. 10. In this example, the user has permissions to reclaim storage volumes from three storage controllers. A respective tab 1001, 1003, 1005 displays the candidate storage volumes for each of the three storage controllers, labelled in the drawing as Controller A, Controller B and Controller C. In FIG. 10, the user has selected the controller A tab 1001. Selecting another of the tabs will change the view to show the candidate storage volumes for one of the other storage controllers.

FIG. 10 shows a set of checkboxes 1007 which can be checked to select one or more of the candidate storage volumes. For ease in illustration, volume name 1009, location 1011 and confidence level 1013 are shown. However, in other embodiments of the invention, other details such as last I/O, host attachments and storage parameters are displayed in additional columns in the interface. In the drawing, candidate storage volumes having a confidence level equal to or exceeding 85% are displayed. By selecting a checkbox and then the reclaim button 1015, the user can designate the candidate storage volume for reclamation. If the user needs more information, instead the expand button 1017 can be selected so that the user interface presents another panel with expanded information about the selected candidate store volume. If the user would like to adjust the confidence level, so that additional or fewer storage volumes are presented, the adjust confidence button 1019 is selected.

In embodiments of the invention, the machine learning system may be trained using a plurality of machine learning algorithms and each of the respective set of results can be used to predict whether a given candidate volume is a reclaimable storage volume. A voting mechanism can be used to produce an aggregate confidence score. The reclamation confidence score algorithm or machine learning model can be refined using user feedback to continually improve the accuracy of algorithm and model, as well as tailoring the algorithm and model for each specific storage environment. During the refinement process, the feedback is gathered when a user acts upon a recommendation by reclaiming a volume, actively dismisses a recommendation, e.g., telling the system to ignore the volume, or ignores a recommendation for greater than a specified time threshold.

In preferred embodiments, determining which recommendations are shown are updated depending on the user context. In one preferred embodiment, only volumes where the reclamation confidence is above a specific threshold are shown. The threshold is modified depending on the current user's permissions, the context that the recommendations are being viewed, e.g., an application view or a storage controller view or a user input value for the minimum volume confidence to be displayed. By displaying a limited number of candidate storage volumes, the storage administrators are only presented a limited number of most likely reclaimable storage volumes. By adjusting the threshold and by presenting the storage parameter information on which the confidence that a given volume is reclaimable, the ability to investigate all the volumes can be reclaimed is preserved. There is a benefit for showing only the volumes about which the system is most confident to relatively inexperienced application users. A high confidence level will help protect storage administrators from being asked to reclaim storage that may actually be used by an application.

In embodiments of the invention, there are two modes of machine learning are used. In these embodiments, supervised learning is used to construct the initial training set, either by manually assembling the training set from user input or surveys, or by selecting among the available storage manager data. The initial machine learning will happen only once and will produce the base machine learning model or reclamation scoring algorithm. As mentioned above, in different embodiments of the invention, the base machine learning model or reclamation scoring algorithm is general to all situations or is specific to a given storage controller or customer set. Then, the machine learning switches over to an unsupervised mode in which the base model and/or scoring algorithm is refined for a particular storage environment according to dynamic user decisions.

Also as mentioned above, in other embodiments, the first phase of machine learning can be unsupervised in which a training set is automatically gathered according to search parameters in the storage manager database.

In the supervised mode, the initial training set can require a large amount of data to train the base model. To generate this large training set, a group of storage administrators who use a target storage manager, e.g., IBM Spectrum Control/ Storage Insights, can be enlisted for their storage history or to fill out one or more surveys. The daily analysis (for the unsupervised mode) of the particular storage environment to refine the model or algorithm requires less information, e.g., only gathering the following data for each reclaimed volume: Number of days since last I/O, Number of host connections, Total I/Os to the volume.

In embodiments of the invention where supervised learning is used in the first phase, the training set can gathered in several ways. A first method is to analyze which volumes are no longer present in a list of assigned volumes from one day to the next for a particular application or customer. These volumes will get classified as reclaimable in the previous day's data set and possibly have their classification removed from the few days prior—turning it into semi-supervised learning. A second method use existing "reclamation recommendations" from a tool like IBM Storage Insights to help a storage administrator identify possible volume reclamation candidates, and have the storage administrator explicitly "flag" the storage volumes which are getting reclaimed. Since the storage administrator will likely have to work with the application owner before deleting the volume, if the storage administrator does not have the information already, the application owner can be manually queried for storage parameters, e.g., roughly how long the volume has not been in use, and that many days prior can be marked as reclaimable. This provides a more accurate set of training data since a closer estimate of how long the storage volume has been reclaimable, rather than using the previous day (the day before the administrator started assembling the training set) as the first day that the storage volume is correctly classified as reclaimable. One skilled in the art can envision many other ways for manually assembling the training set. Embodiments of the present invention ship with a machine learning model which has been pretrained on a default training set, and rely on the second phase of the learning to tailor the model to a particular configuration.

As is discussed above, the second phase of the machine learning algorithms will use the machine learning application to tailor the base model or confidence algorithm to a particular storage environment. Each storage environment is different. Some environments may tend to have more unmapped volumes which are reclaimable, while others have a long period of time after the volume is provisioned before it is mapped to a host, but it is not-yet reclaimable. Some of the differences in storage environments is due to the personal practices and preferences of the storage administrator in charge of the environment. The administrators of some storage environments may wait weeks without I/O before reclaiming a candidate storage volume, others wait months. By gathering feedback from each user—either implicit feedback, such as noticing a volume is deleted, or that a recommendation has not been acted upon in a certain amount of time, or explicit feedback, such as a reclamation recommendation being taken or ignored, training points for the online machine learning algorithm can be generated. There are many machine learning algorithms which can take either one or a few of these training points at a time to continually refine the confidence algorithm or machine learning model over time. In addition to refining the predictions, updating the learned model will have the added benefit of refining the confidence values for each data point as well.

The present invention has many advantages over the prior art. Rather than forcing a storage administrator to manually go through the difficult, manual, and time-consuming process of analyzing thousands of volumes for multiple storage parameters, a set of candidate reclaimable storage volumes, and optionally confidence levels and associated storage parameters, is presented to the administrator. The machine learning techniques and environmental metadata in embodiments of the invention can tailor the recommendations for each of a plurality of storage environments. The system continually refines and tailors the reclamation algorithms for each specific storage environment to improve recommendation accuracy. In addition, embodiments of the invention provide flexibility to adjust the number of candidate storage volumes presented in the user interface based on user context and permissions.

While a preferred operating environment and use case has been described, the techniques herein may be used in any other operating environment in which it is desired to deploy services.

As has been described, the functionality described above may be implemented as a standalone approach, e.g., one or more software-based functions executed by one or more hardware processors, or it may be available as a managed service (including as a web service via a SOAP/XML or RESTful interface). The particular hardware and software implementation details described herein are merely for illustrative purposes are not meant to limit the scope of the described subject matter.

More generally, computing devices within the context of the disclosed subject matter are each a data processing system comprising hardware and software, and these entities communicate with one another over a network, such as the Internet, an intranet, an extranet, a private network, or any other communications medium or link. The applications on the data processing system provide native support for Web and other known services and protocols including, without limitation, support for HTTP, FTP, SMTP, SOAP, XML, WSDL, UDDI, and WSFL, among others. Information regarding SOAP, WSDL, UDDI and WSFL is available from the World Wide Web Consortium (W3C), which is responsible for developing and maintaining these standards; further information regarding HTTP, FTP, SMTP and XML is available from Internet Engineering Task Force (IETF).

In addition to the cloud-based environment, the techniques described herein may be implemented in or in conjunction with various server-side architectures including simple n-tier architectures, web portals, federated systems, and the like.

Still more generally, the subject matter described herein can take the form of an entirely hardware embodiment, an entirely software embodiment or an embodiment containing both hardware and software elements. In a preferred embodiment, the module functions are implemented in software, which includes but is not limited to firmware, resident software, microcode, and the like. Furthermore, the interfaces and functionality can take the form of a computer program product accessible from a computer-usable or computer-readable medium providing program code for use by or in connection with a computer or any instruction execution system. For the purposes of this description, a computer-usable or computer readable medium can be any apparatus that can contain or store the program for use by or in connection with the instruction execution system, apparatus, or device. The medium can be an electronic, magnetic, optical, electromagnetic, infrared, or a semiconductor system (or apparatus or device). Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD. The computer-readable medium is a tangible, non-transitory item.

The computer program product may be a product having program instructions (or program code) to implement one or more of the described functions. Those instructions or code may be stored in a computer readable storage medium in a data processing system after being downloaded over a network from a remote data processing system. Or, those instructions or code may be stored in a computer readable storage medium in a server data processing system and adapted to be downloaded over a network to a remote data processing system for use in a computer readable storage medium within the remote system.

In a representative embodiment, the techniques are implemented in a special purpose computing platform, preferably in software executed by one or more processors. The software is maintained in one or more data stores or memories associated with the one or more processors, and the software may be implemented as one or more computer programs. Collectively, this special-purpose hardware and software comprises the functionality described above.

In the preferred embodiment, the functionality provided herein is implemented as an adjunct or extension to an existing cloud compute deployment management solution.

While the above describes a particular order of operations performed by certain embodiments of the invention, it should be understood that such order is exemplary, as alternative embodiments may perform the operations in a different order, combine certain operations, overlap certain operations, or the like. References in the specification to a given embodiment indicate that the embodiment described may include a particular feature, structure, or characteristic, but every embodiment may not necessarily include the particular feature, structure, or characteristic.

Finally, while given components of the system have been described separately, one of ordinary skill will appreciate that some of the functions may be combined or shared in given instructions, program sequences, code portions, and the like.

Having described our invention, what we now claim is as follows.

The invention claimed is:

1. A method for performing storage maintenance comprising:
   receiving a training set for storage volume reclamation comprising sets of storage parameters for storage volumes and corresponding user decisions whether the storage volumes are reclaimable;
   using the training set to train a machine learning system to recognize reclaimable candidate storage volumes; and
   using the trained machine learning system to determine that a candidate storage volume for reclamation is likely a reclaimable storage volume.

2. The method as recited in claim 1, wherein the sets of storage parameters comprise last I/O, host attachments, and historical access patterns for a respective storage volume.

3. The method as recited in claim 1, further comprising:
   receiving a new training set for storage volume reclamation, the new training set comprising the user decision for reclaiming a respective candidate storage volume and the set of storage parameters for a respective candidate storage volume;

using the new training set to update the training of the machine learning to recognize common features of reclaimable candidate storage volumes.

4. The method as recited in claim 3, wherein the new training set comprises a first user decision, the first user decision is a presentation of a candidate storage volume to a first user which has remained unclaimed for greater than a predetermined time threshold.

5. The method as recited in claim 1, further comprising:
scoring candidate storage volumes within the set of candidate storage volumes according to a comparison between common features of a set of candidate storage volumes to common features of the training set of candidate storage volumes; and
presenting a plurality of candidate storage volumes having scores exceeding a predetermined threshold.

6. The method as recited in claim 5, wherein the plurality of candidate storage volumes is presented in a user interface according to user context.

7. The method as recited in claim 6, further comprising:
determining a set of permissions of a first user;
determining the threshold according to the set of permissions of the first user; and
wherein the threshold is set lower for a first user having a greater set of permissions than for a second user having a lesser set of permissions.

8. The method as recited in claim 6, wherein the user context comprises a set of storage volumes the user is authorized to reclaim.

9. Apparatus, comprising:
a processor;
computer memory holding computer program instructions executed by the processor for performing database maintenance, the computer program instructions comprising:
a storage manager for managing storage volumes in a storage facility, the managing including reclaiming storage volumes;
a machine learning system for receiving a training set for storage volume reclamation and using the training set to recognize reclaimable candidate storage volumes, the training set for storage volume reclamation comprising sets of storage parameters for storage volumes and corresponding user decisions whether the storage volumes are reclaimable;
program code, operative to provide a candidate storage volume for reclamation with a set of storage parameters; and
wherein the trained machine learning system is used to determine that the candidate storage volume for reclamation is likely a reclaimable storage volume.

10. The apparatus as recited in claim 9, further comprising:
program code, operative to receive a new training set for storage volume reclamation, the new training set comprising the user decision for reclaiming a respective candidate storage volume and the set of storage parameters for a respective candidate storage volume; and
program code, operative to use the new training set to update the training of the machine learning to recognize reclaimable candidate storage volumes.

11. The apparatus as recited in claim 9, further comprising:
program code, operative to score candidate storage volumes within the set of candidate storage volumes according to a comparison between common features of a set of candidate storage volumes to common features of the training set of candidate storage volumes; and
program code, operative to present a plurality of candidate storage volumes having scores exceeding a predetermined threshold.

12. The apparatus as recited in claim 11, further comprising:
program code, operative to set the predetermined threshold according to user context and permissions.

13. The apparatus as recited in claim 11, further comprising:
program code, operative to logically group storage volumes according to a set of storage customers;
program code, operative to select a first training set for a first storage customer, wherein the first training set for storage volume reclamation comprising a first set of storage parameters for a first set of storage volumes and corresponding user decisions whether the first set of storage volumes are reclaimable;
program code, operative to select a second training set for a second storage customer, wherein the second training set for storage volume reclamation comprising a second set of storage parameters for a second set of storage volumes and corresponding user decisions whether the first set of storage volumes are reclaimable; and
program code, operative to train a first machine learning model for storage volumes belonging to the first storage customer using the first training set and a second machine learning model for storage volumes belonging to the second storage customer using the second training set.

14. The apparatus as recited in claim 11, wherein the storage manager manages a plurality of storage controllers, and the apparatus further comprises:
program code, operative to logically group storage volumes according to a set of storage controllers;
program code, operative to select a first training set for a first storage controller, wherein the first training set for storage volume reclamation comprising a first set of storage parameters for a first set of storage volumes and corresponding user decisions whether the first set of storage volumes are reclaimable;
program code, operative to select a second training set for a second storage controller, wherein the second training set for storage volume reclamation comprising a second set of storage parameters for a second set of storage volumes and corresponding user decisions whether the second set of storage volumes are reclaimable; and
program code, operative to train a first machine learning model for storage volumes belonging to the first storage controller using the first training set and a second machine learning model for storage volumes belonging to the second storage controller using the second training set.

15. A computer program product in a non-transitory computer readable medium for use in a data processing system, the computer program product holding computer program instructions executed by the data processing system for performing database maintenance, the computer program instructions comprising:
program code, operative to receive a training set for storage volume reclamation comprising sets of storage parameters for storage volumes and corresponding user decisions whether the storage volumes are reclaimable;

program code, operative to use the training set to train a machine learning system to recognize reclaimable candidate storage volumes; and program code, operative to use the trained machine learning system to determine that a candidate storage volume for reclamation is likely a reclaimable storage volume.

16. The computer program product as recited in claim 15, further comprising:

program code, operative to receive a new training set for storage volume reclamation, the new training set comprising user decisions for reclaiming respective candidate storage volumes and the set of storage parameters for respective candidate storage volumes, the user decision occurring in a first storage environment; and program code, operative to use the new set of user decisions to update the training of the machine learning to recognize reclaimable candidate storage volumes for the first storage environment.

17. The computer program product as recited in claim 15, further comprising:

program code, operative to score candidate storage volumes within the set of candidate storage volumes according to a comparison between common features of a set of candidate storage volume to common features of the training set of candidate storage volumes; and program code, operative to present a plurality of candidate storage volumes having scores exceeding a predetermined threshold.

18. The computer program product as recited in claim 15, further comprising:

program code, operative to determine a first set of permissions of a first user and a second set of permissions of a second user;

program code, operative to determine a first threshold according to the first set of permissions of the first user and a second threshold according to the second user; and wherein the first threshold is set lower for the first user having a greater set of permissions than the second threshold for the second user having a lesser set of permissions.

19. The computer program product as recited in claim 15, further comprising:

program code, operative to logically group storage volumes according to a set of storage customers;

program code, operative to select a first training set for a first storage customer, wherein the first training set for storage volume reclamation comprising a first set of storage parameters for a first set of storage volumes and corresponding user decisions whether the first set of storage volumes are reclaimable;

program code, operative to select a second training set for a second storage customer, wherein the second training set for storage volume reclamation comprising a second set of storage parameters for a second set of storage volumes and corresponding user decisions whether the second set of storage volumes are reclaimable; and program code, operative to train a first machine learning model for storage volumes belonging to the first storage customer and a second machine learning model for storage volumes belonging to the second storage customer.

20. The computer program product as recited in claim 15, wherein the set of candidate storage volumes is a set of orphan storage volumes.

\* \* \* \* \*